United States Patent [19]
Leyva et al.

[11] 4,204,499
[45] May 27, 1980

[54] NEWT SANCTUARY

[76] Inventors: Rodolfo M. Leyva, 1318 W. 11th, Odessa, Tex. 79761; James E. Allison, Jr., 3687 W. 13th - Apt. 6G, Wichita, Kans. 67203

[21] Appl. No.: 950,232

[22] Filed: Oct. 10, 1978

[51] Int. Cl.² ............................................. A01K 64/00
[52] U.S. Cl. ........................................................ 119/5
[58] Field of Search ........................... 119/5, 2, 3, 4, 17

[56] References Cited

U.S. PATENT DOCUMENTS

| | | | |
|---|---|---|---|
| 296,853 | 4/1884 | Ledig | 119/5 |
| 1,943,417 | 1/1934 | Bringman | 119/5 |
| 3,269,578 | 8/1966 | Lewis | 119/5 X |
| 3,283,743 | 11/1966 | Dibelius | 119/5 |

FOREIGN PATENT DOCUMENTS 1128137  1/1957  France ........................................... 119/5

Primary Examiner—Hugh R. Chamblee
Attorney, Agent, or Firm—Robert E. Breidenthal

[57] ABSTRACT

An airtight, open topped receptacle of transparent material totally immersed in inverted position in the water of an aquarium in spaced relation to the side walls of the latter. The lower periphery of the receptacle is spaced above the bottom of the aquarium to allow newts to pass freely therebetween. An air supply feed line supplies air into the receptacle so that an air bubble chamber is established in the latter. An aquarium bottom cover is heaped to extend into the air bubble chamber. For newt training purposes, an optional closure structure is provided for temporarily preventing movement of the newts out of the receptacle.

16 Claims, 7 Drawing Figures

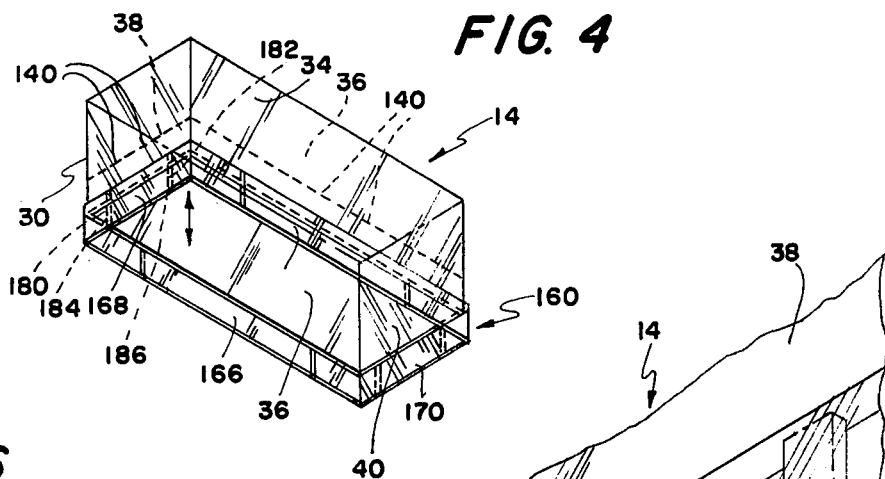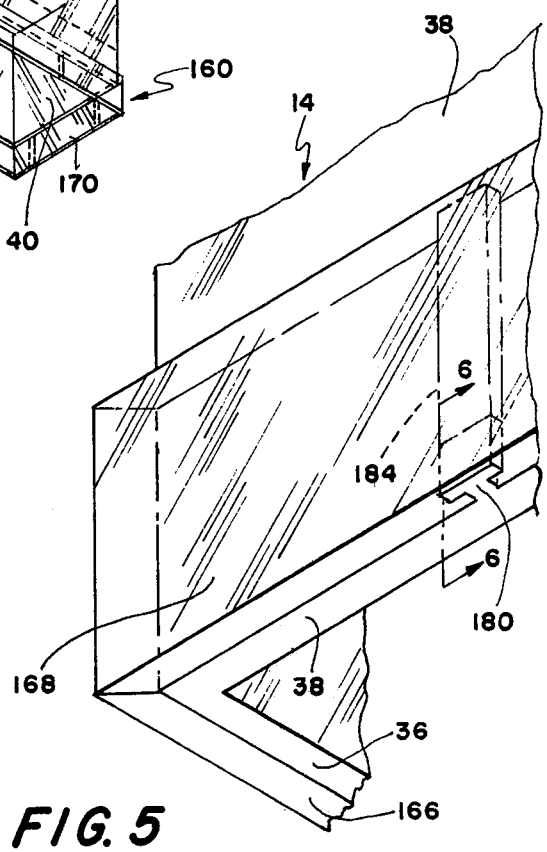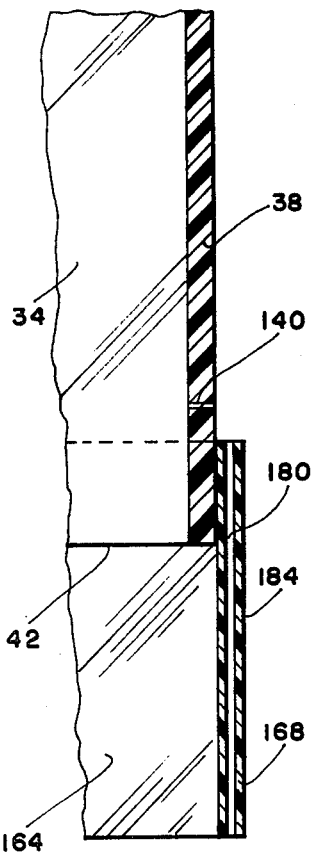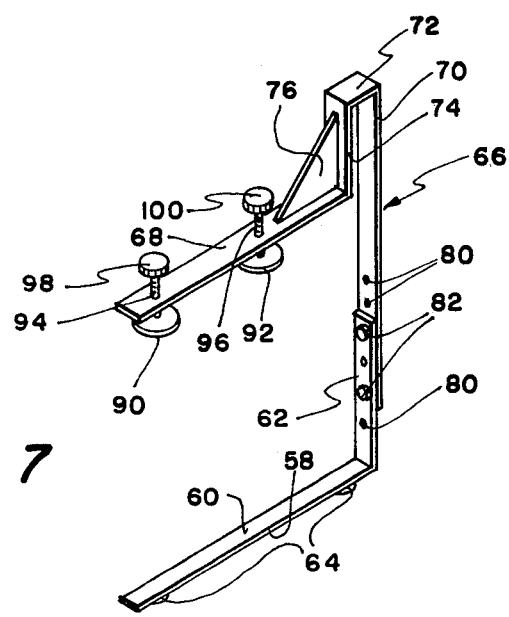

NEWT SANCTUARY

The present invention relates to new and useful improvements in aquariums, and more particularly pertains to an aquarium provided with a submerged air bubble structure wherein an oxygen rich air zone is maintained that is freely accessible to newts entering and leaving the same under the lower edges of the structure, with the bottom material of the aquarium extending above the air-water interface that is accessible to the newts for their support.

It is both entertaining and educational to observe closely the day-to-day activities of newts, especially for children, and it is the paramount object of the instant invention to provide equipment that can be employed in conjunction with extant aquariums such that an oxygen-rich air bubble can be established and maintained that affords free ingress and egress for newts relative to any location in the aquarium, including water filled zones above and to the sides of the air bubble, and wherein aquarium bottom material projects upwardly into the air bubble for supporting newts in the air bubble at a position above the air-water interface.

Another important object is to provide air bubble structure that will enable observation of the interior thereof, and which will serve largely to confine fish to zones immediately adjacent the top water surface and the side walls of the aquarium whereby they are more susceptible to close viewing.

Another important object of the invention is to provide the air bubble structure with ancillary equipment for temporarily obstructing egress of newts placed in the air bubble so that newts unfamiliar with the air bubble structure can be compelled to learn that they can breathe in the air bubble and that they need not retire to the top water surface of the aquarium to breathe.

A final important object to be specifically enumerated is to provide an air bubble structure that can be easily installed and leveled in an extant aquarium, and wherein the buoyancy forces exerted against the air bubble are applied against the underside of the bottom of the aquarium.

Broadly, one aspect of the invention involves an aquarium accessory comprising a housing that includes a transparent top wall from which peripherally depends a transparent side wall having a lower edge, said housing being adapted to be received within and submerged below water in an aquarium, means for introducing air into the housing, mounting means for mounting the housing within an aquarium in such a manner as to oppose buoyance forces of the latter, and passageway means disposed in a horizontal plane and disposed about the periphery of the side wall adjacent the lower edge of the side wall for allowing air to pass from the interior to the exterior of the housing.

A somewhat more limited aspect of the invention involves an aquarium of the type including a bottom wall peripherally bounded by an upstanding transparent side wall for holding water to a predetermined water level therein in combination with a sanctuary for amphibians disposed within the aquarium, said sanctuary being of lesser horizontal dimensions than the aquarium and comprised of a hollow and transparent air bubble trapping structure that is impervious to air above a predetermined air level therein, passage means disposed below said air level for the passage of amphibians into and out of the air bubble trapping structure that is disposed at least in part above the air level for supporting amphibians thereon, and means for introducing air into the interior of the air bubble trapping structure.

Other objects, aspects as well as advantageous features of the invention will become manifest during the following description of a preferred embodiment of the same, such description being given in conjunction with the accompanying drawings FIG. 1 is an isometric view of the invention showing the same with the bottom material (newt support) removed and with the means for obstructing egress of newts from the air bubble being shown in operative (lowered) position;

FIG. 4 is an underside isometric view of the air bubble trapping structure with the obstructing means shown thereon in full lines in obstructing position and in dashed outline in raised non-obstructing position;

FIG. 5 is an enlarged isometric view looking upwardly at the underside of one corner of the air bubble trapping structure and its associated movable obstructions, with the latter shown in their raised, non-obstructing positions, and with certain hidden structural details being shown in dashed outline;

FIG. 6 is an enlarged vertical sectional detail view which is taken on the plane of the section line 6—6 in FIG. 5, the view being taken, however, with the obstruction in obstructing (lowered) position; and, FIG. 7 is an isometric view of one of the pair of mounting brackets used to connect the air bubble structure to the aquarium.

Figure 1:
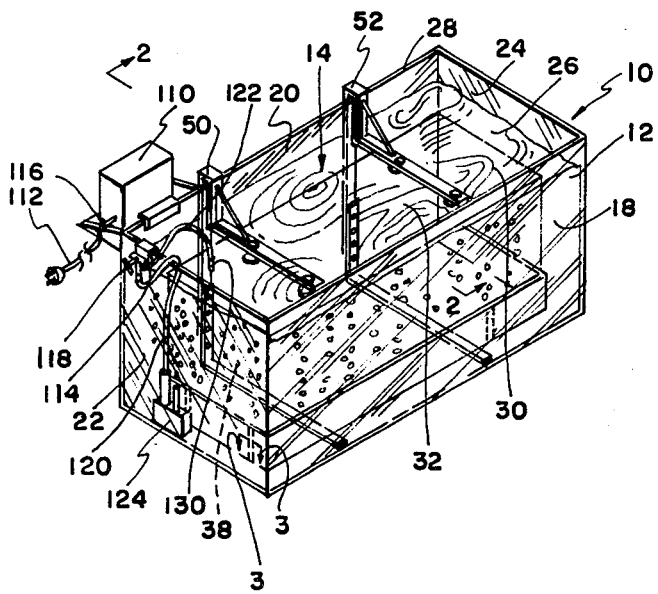

Referring now to the drawings wherein like numerals designate like parts throughout the various views, the reference numeral 10 designates generally the combination of a conventional aquarium 12 equipped with a sanctuary therein designated generally at 14.

The aquarium 12 is entirely conventional and can conveniently be of parallelepiped shape inclusive of a rectangular and horizontally disposed bottom wall 16 peripherally bounded by upstanding rectangular transparent front and rear walls 18 and 20 that are joined by upstanding rectangular transparent side walls 22 and 24. The transparent walls of the aquarium 12 can conveniently be formed of glass. All junctures of the upstanding walls 18, 20, 22 and 24 with each other and with the bottom wall 16 are suitably sealed in a conventional manner to be watertight so as to constitute a watertight container for holding water therein to a water level 26 therein spaced below the open top 28 of the aquarium 12.

The sanctuary 14 is constituted of an air bubble trapping structure 30 that preferably has an overall configuration largely similar to and scaled down from that of the aquarium, and accordingly, in the illustrated embodiment of the invention the structure 30 comprises a rectangular and horizontally disposed top wall 32 that is peripherally bounded by depending rectangular front and rear walls 34 and 36 that are joined by depending side walls 38 and 40. The lower edges of the walls 34, 36, 38 and 40 terminate at a common horizontal plane 42 that is spaced above the bottom wall 16 of the aquarium 12 for reasons subsequently to become evident.

In the preferred construction, all the walls 32-40 of the structure 30 are of transparent material and they are sealed together along the entire extent of all their junctures in any suitable airtight fashion. The walls of the structure 30 can be of glass or of any suitable synthetic resin such as an acrylate resin sheet material such as marketed under trademarks Lucite or Plexiglas. The structure 30 can conveniently be fabricated of any suitable synthetic resin and the junctures made and sealed by the use of any suitable adhesive or joining substance of waterproof character. When the synthetic resin is, as is preferred, a thermoplastic material, the joining and sealing can be effected by heat sealing or by heat fusing the walls of the structure 30 together along their junctures.

From another viewpoint the air bubble trapping structure 30 may be considered to be an open-topped housing placed in the aquarium 12 in an inverted position. The structure 30 is maintained in its illustrated position within the aquarium 12 by means of a pair of bracket assemblies 50 and 52 which coact with the buoyancy forces experienced by the structure 30 when an air bubble 54 is trapped inside and the same is immersed in water 56.

As the bracket assemblies 50 and 52 are identical, a detailed description of one will suffice for both. The bracket assembly 52 (best shown in FIG. 7) comprises a metallic L-shaped base 58 inclusive of a horizontal leg 60 that is integral with an upstanding leg 62. The leg 60 is disposed below the bottom wall 16 of the aquarium 12 to support the latter, and the leg has a spaced pair of cushion feet 64 of neoprene or the like attached to its underside as shown, whereby the base leg 60 can be supported on a table top or display shelf, not shown.

The upstanding base leg 62 constitutes the lower portion of a vertical standard 66 that connects the base leg 60 to a holding bar 68 that directly overlies the base leg 60 in spaced parallel relation thereto. The standard 66 includes an upper portion constituted of a vertical leg 70 that overlaps the base leg 62, with the leg 70 being integral with an inverted L-shaped member comprised of a short horizontal leg 72 and a vertical leg 74. The lower end of the leg 74 is integrally joined to one end of the holding bar 68 as shown.

As will become evident, the angle defined at the juncture of the holding bar 68 with the leg 74 is subject to considerable stress and such juncture is reinforced by a gusset plate 76. As all the other angular junctures in the bracket assembly 52 are also subject to considerable bending moments, they too can be provided with suitable reinforcing means, not shown, if deemed necessary or expedient. For example, the gusset plate 76 could be extended as an external rib about the angular junctures of the leg 72 with the legs 70 and 74. Such further reinforcing is not shown as the materials selected for the legs 60, 62, 70, 72 and 74 may be of sufficient size as to make such provision unnecessary, and for the further reason soon to become apparent that the leg 74 may bear against the aquarium wall 20 with sufficient force to transfer a substantial part of the bending moment to the aquarium 12.

In order to facilitate application of the bracket assembly 52 to the aquarium 12 and to enable adjustable spacing of the holding bar 68 above the base leg 60 to suit a user's preference as well as to make the bracket assembly 52 usable with different sized aquariums, means is provided to secure the overlapping standard legs 62 and 70 in adjusted vertical relationship to each other. Such means comprises each of the legs 62 and 70 being provided with a series of spaced openings 80, together with a pair of releasable threaded fasteners 82 passed through openings selectively placed in registry in making vertical adjustment of the leg 70 to secure the legs 62 and 70 together.

The bracket 52 is disposed with the legs 62 and 70 engaging or closely spaced to the exterior of the aquarium rear wall 20 with the leg 72 immediately overlying the upper edge of the wall so that the leg 74 engages or is closely spaced to the upper interior of the wall 20. The holding bar 68 directly overlies the top wall 32 of the structure 30 and a pair of spaced bearing pads 90 and 92 are provided to engage the top wall 32, such pads being carried at the lower ends of a pair of vertical threaded stems 94 and 96 that threadably extend through suitable openings through the holding bar 68, whereby vertical adjustment of the positions of the pads 90 and 92 can be made. Knurled knobs 98 and 100 are fixed to the upper ends of the stems 94 and 96 to facilitate finger turning of the stems 94 and 96. Preferably the pads 90 and 92 are swivelly or rotatably mounted on the lower ends of the stems 94 and 96 in a conventional manner such as that commonly employed in the mounting of the bearing pads on their threaded stems in C-clamps. Such mounting facilitates easy turning of the stems 94 and 96 and minimizes any disfigurement of the top wall 32 by the pads 90 and 92.

It will be evident that the adjustable pads of the bracket assemblies 50 and 52 coact in enabling the user to precisely adjust the top wall 32 to a horizontal position.

Inasmuch as each of the horizontal dimensions of the aquarium 12 are considerably greater than the corresponding dimensions of the sanctuary 14, the above described means for mounting the latter enables, subject to the user's preference, the sanctuary 14 to be shifted to the right or left and forwardly or rearwardly from its illustrated position in the aquarium. Indeed, the sanctuary 14 can be turned clockwise or anticlockwise to a limited extent from its illustrated position. For example, the sanctuary 14 can, if desired, be positioned so that its walls 36 and 40 are essentially flush respectively with the aquarium walls 20 and 24 with a corresponding increase in the spacing of the walls 34 and 18 on one hand and of the walls 38 and 22 on the other hand.

The assemblies 50 and 52 are preferably metallic, and can be of chrome steel or aluminum for example, though stainless steel is preferred because of its bright appearance and resistance to corrosion.

Means is provided for introducing air into the sanctuary 14 and also for aerating the water 56. Such means comprises a conventional air pump unit 110 mounted as shown on top of the aquarium wall 20. The pump is electrically powered and includes an electric power cord 112 for its energization for electric power mains. The output of the pump 110 is connected to a conventional proportioning valve means 114 mounted on the top of the aquarium wall 22 as shown by a short flexible hose 116. The valve means 114 includes a manually operable control knob 118 by means of which the proportion of the distribution of air fed to the valve means 114 from the pump 110 into the two flexible output hoses 120 and 122 of the valve means 114 is controlled. The hose 120 is connected to a conventional aeration unit 124 immersed in the bottom of the aquarium between the walls 38 and 22. The unit 124 is immersed in the water 56 and serves to introduce the air delivered by the hose 120 into the water 56 in a finely divided form (minute bubbles) so that a maximized air-water interface is established that is conducive to oxygen absorption by the water.

The top wall 32 of the sanctuary is provided with an inlet opening surrounded by an upstanding filling nipple 130, and the flexible and elastic hose 122 is normally fitted snugly about the nipple 130 so that air can be introduced into the sanctuary 14.

As thus far described the air output of the pump 110 is delivered to the aerator unit 124 and to the interior of the sanctuary 14 in proportions selectable by the user by means of the proportioning valve 114 and its control knob 118.

The forced introduction of air into the sanctuary 14 entraps air in the latter (such entrapped air being referred to as the "air bubble") as the structure 30 constituting the sanctuary is impervious to air above the level of air egress now to be described. Each of the walls 34, 36, 38 and 40 is provided with a horizontal row of small perforations 140 therethrough, with all of such rows of perforations 140 being at a common horizontal plane that coincides with the water level 142 in the sanctuary 14, as the air can escape from the latter through the perforations 140. The perforations 140 are preferably fine so as to facilitate oxygen escaping the air bubble 54 being absorbed by the water 56. It should be noted that the mounting means for the sanctuary enables precise leveling of the perforations 140 so as to equalize or make uniform the egress of air about the periphery of the sanctuary 14.

Figure 2:
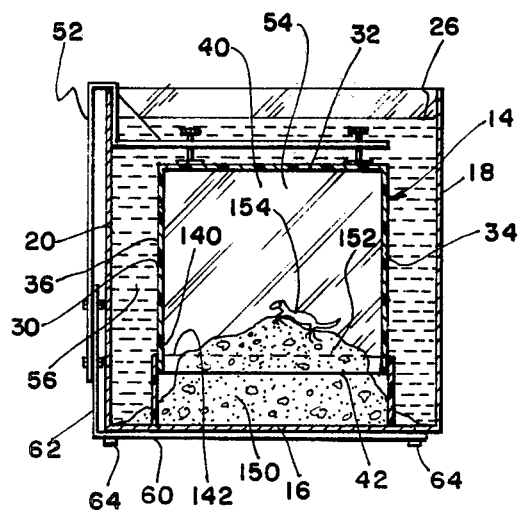
FIG. 2 is an enlarged transverse sectional view taken upon the plane of the section line 2—2 in FIG. 1, with the bottom material being shown together with a newt undergoing training being shown thereon.
Figure 3:
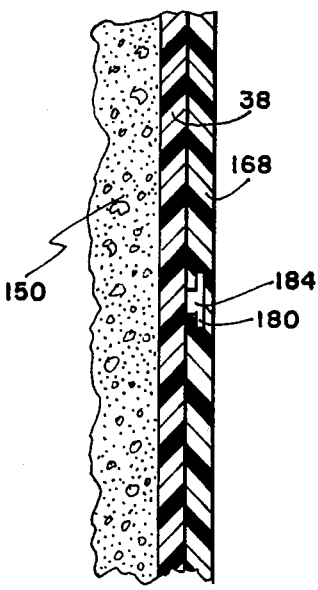
FIG. 3 is an enlarged horizontal sectional detail view taken upon the plane of the section line 3—3 in FIG. 1.

Material such as sand, gravel, beads, shells, and the like, 150 that are normally placed on the bottom wall 16 of the aquarium 14 are heaped to form a mound 152 thereof under the sanctuary 14 in such a manner that the lower edges of the walls 34, 36, 38 and 40 are spaced above the material 150 (so that newts and the like can freely pass under the walls to enter and depart the sanctuary) and so that the heap 152 extends above the water surface 142 in the sanctuary 14 so that newts and the like can surface within the sanctuary 14 and move above the water surface 142 and upon the heap 152 to rest upon the latter as the newt depicted at 154 in FIG. 2.

As thus far described, the amphibious newt 154 can at his pleasure enter and leave the sanctuary 14 and breathe from the air bubble 54 when in the latter. When outside the sanctuary 14, the newt as well as other inhabitants (goldfish, etc., not shown) can move freely in the water 56 about the sides of and over the top of the sanctuary.

In assembling the combination 10, the structure 30 can be easily placed in the aquarium 12 (after heaping the material 150) whether water filled or not when the hose 122 is disconnected from the nipple 130 (so that air entrapment is avoided) after which the brackets 50 and 52 are roughly positioned. The air hose 122 is then connected to the nipple 130 and the introduction of air is slowly commenced so that the structure 30 floats to engage the brackets 50 and 52, whereupon the latter are secured and adjusted. As the introduction of air displaces water, excess water can be simply dipped from the aquarium 12.

The introduction of air is continued until the water level 142 is established after which the valve 114 is set as desired and final adjustments of the brackets 50 and 52 are made.

Inasmuch as experience has shown that a newt has to be taught that he can breathe within the air bubble and that if a newt is simply placed within the air bubble, prior to training, the newt will not breathe in the air bubble and will leave the sanctuary 14 to breathe at the water surface 26 at the top of the aquarium 12. Indeed, such newt may be reluctant thereafter to return to the air bubble.

The newt can be "trained" or taught that he can breathe in the air bubble and thereafter the newt will freely enter and leave the sanctuary 14 and manifest a marked tendency to remain in the same except when offered food externally of the sanctuary. Such training can be forced upon the newt by placing him in the sanctuary 14 and thereafter preventing his escape until he has breathed within the air bubble and done so for an interval of time. The newt will, on sustained confinement in the air bubble, ultimately be forced to breathe therein.

The sanctuary 14 is provided with optional means whereby the training described above can be easily carried out. Such optional means are designated at 160 and comprise providing separate and detachable downward extensions or newt obstructions 164, 166, 168 and 170 respectively for the walls 34, 36, 38 and 40. Such newt obstructions 164-170 are shown as being of the same material as the walls 34-40, however, since their only function is to obstruct the movements of newts and are not intended to be air or watertight, it will be evident to those skilled in the art that they can be largely perforate such as being formed of framed screening and the like with only obvious and modest changes in the hereinafter described guides being necessary.

Means are provided in association with each of the walls 34, 36, 38 and 40 and its respective extension or obstruction 164, 166, 168 and 170 for detachably securing them together and for guiding relative vertical movement of the extension. The character of such guide means will be best appreciated on reference to FIGS. 3, 4, 5 and 6. Inasmuch as the guide means provided for each wall 34, 36, 38 and 40 and its associated detachable extension are essentially identical, only such means provided for the wall 38 and its associated extension 168 is described in detail.

The wall 38 is provided at spaced positions along its lower edge with a pair of T-shaped guide lugs 180 and 182 which are slidingly and guidingly received respectively in complementary shaped and undercut grooves or slots 184 and 186 in and extending the entire vertical height of the extension 168. The vertical height of the extension 168 exceeds the spacing of the wall 38 above the bottom wall 16. The sliding fit of the lugs 180 and 182 in their respective guide slots 184 and 186 can be loose as can the spacing of the wall 38 from the extension 168.

To use the extension 168, the same moved down alongside the exterior of the wall 38, until the lugs 180 and 182 enter the slots 184 and 186 after which further downward movement of the extension 168 until the latter engages the bottom wall 16 or material 150 on the latter is guided by coaction of the guide lugs and guide slots. Detachment of the extension 168 is effected by simply reversing the above procedure.

It will be noted that the end extremities of the extensions 164-170 are beveled as at 190 so that a loose miter joint-like junction is defined between adjoining extensions 164-170.

The use of the extensions 164-170 and the benefits flowing therefrom will be self-evident in the light of the newt training method previously set forth.

Attention is now directed to the appended claims which are definitive of the actual scope of the invention.

We claim:

1. An aquarium accessory comprising a housing that includes a transparent top wall from which peripherally depends a transparent side wall having a lower edge that is in its entirety spaced below the top wall, said housing having an open bottom and being adapted to be received within and submerged below water in an aquarium, said walls being of a material impervious to air, means including a forced air pump for introducing atmospheric air into the housing whereby air can be entrapped in the housing above water in which the latter may be submerged, mounting means for mounting the housing within an aquarium in such a manner as to oppose buoyance forces of the latter, and passageway means disposed in a horizontal plane and disposed about the periphery of the side wall adjacent the lower edge of the side wall for allowing air to pass from the interior to the exterior of the housing.

2. The combination of claim 1, including obstacle means disposed about the periphery of the side wall and vertically movable with respect to the latter for selectively extending the effective downward extent of the latter from the top wall, whereby the obstacle means can be extended downwardly to constitute an obstacle to the egress of newts and the like from the housing.

3. An aquarium accessory comprising a housing that includes a transparent top wall from which peripherally depends a transparent side wall having a lower edge, said housing being adapted to be received within and submerged below water in an aquarium, means for introducing air into the housing, mounting means for mounting the housing within an aquarium in such a manner as to oppose buoyance forces of the latter, said mounting means including a base adapted to underlie an aquarium and a horizontal holding bar spaced above the base, a vertical standard connecting the base and the bar and adapted to extend along the outside of an aquarium, with said holding bar overlying the top wall of the housing in an arrangement such as to oppose upward movement of the housing, and passageway means disposed in a horizontal plane and disposed about the periphery of the side wall adjacent the lower edge of the side wall for allowing air to pass from the interior to the exterior of the housing.

4. An aquarium of the type including a bottom wall peripherally bounded by an upstanding transparent side wall for holding water to a predetermined water level therein in combination with a sanctuary for amphibians disposed within the aquarium, said sanctuary being of lesser horizontal dimensions than the aquarium and comprised of a hollow and transparent air bubble trapping structure that is impervious to air above a predetermined air level therein, passage means disposed below said air level for the passage of amphibians into and out of the air bubble trapping structure, support means within the air bubble trapping structure that is disposed at least in part above the air level for supporting amphibians thereon, and means for introducing air into the interior of the air bubble trapping structure.

5. The combination of claim 4, including air bubble trapping structure having a plurality of openings therethrough spaced along the air level for establishing the latter and enabling the egress of air from within said structure.

6. The combination of claim 4, together with obstruction means for selectively obstructing the passage means whereby amphibians can be detained within the air bubble trapping structure for a selectable time interval.

7. The combination of claim 6, wherein said obstructing means comprises said air bubble trapping structure being provided with an amphibian obstruction movably mounted thereon for movement between positions that respectively obstruct and do not obstruct the passage means.

8. The combination of claim 6, wherein said obstructing means comprises said air bubble trapping structure being provided with an amphibian obstruction movably mounted thereon for movement between positions that respectively obstruct and do not obstruct the passage means, said obstruction being movable vertically between said positions with the obstructing position being lowermost, coacting guide means carried by the obstruction and the structure for guiding the vertical movement of the obstruction.

9. The combination of claim 6, wherein said obstructing means comprises said air bubble trapping structure being provided with an amphibian obstruction movably mounted thereon for movement between positions that respectively obstruct and do not obstruct the passage means, said obstruction being movable vertically between said positions with the obstructing position being lowermost, coacting guide means carried by the obstruction and the structure for guiding the vertical movement of the obstruction and also for detaching the obstruction from said structure on raising the obstruction above its non-obstructing position.

10. The combination of claim 4, wherein the structure includes a top wall disposed at a height below said water level, a side wall attached to the top wall and depending therefrom to terminate at a lower edge spaced above the bottom wall of the aquarium with such spaced relationship constituting said passage means.

11. The combination of claim 10, wherein said support means is carried by the bottom wall of the aquarium.

12. The combination of claim 10, wherein the air bubble trapping structure is separable from the aquarium, and connecting means connecting the aquarium and said structure for maintaining the structure in operative position in the aquarium and for opposing the buoyancy forces experienced by the structure during use.

13. The combination of claim 12, wherein said connecting means comprises a spaced pair of brackets, each of said brackets comprising a base underlying the bottom wall of the aquarium and a holding bar overlying the top wall of the air bubble trapping structure, and an upstanding standard connecting the base and the holding bar.

14. The combination of claim 13, wherein a pair of spaced bearing pads are mounted on the holding bar and arranged to engage and bear against the top wall of said structure, with at least one of said pads being mounted in vertically adjustable relation on the holding bar, and means for releasably retaining the pad in its vertically adjusted relation on the holding bar.

15. The combination of claim 13, wherein said standard is comprised of two sections that are movable vertically relative to each other, and means for releasably securing the standard sections in selected relative vertical relationship.

16. The combination of claim 13, wherein a pair of spaced bearing pads are mounted on the holding bar and arranged to engage and bear against the top wall of said structure, with at least one of said pads being mounted in vertically adjustable relation on the holding bar, and means for releasably retaining the pad in its vertically adjusted relation on the holding bar and wherein said standard is comprised of two sections that are movable vertically relative to each other, and means for releasably securing the standard sections in selected relative vertical relationship.

* * * * *